United States Patent [19]

Smilgys

[11] Patent Number: 4,473,742
[45] Date of Patent: Sep. 25, 1984

[54] COUNTER WHEEL ASSEMBLY WITH IMPROVED DRIVE CLUTCH MECHANISM

[75] Inventor: Bruno S. Smilgys, Hartford, Conn.

[73] Assignee: Veeder Industries Inc., Hartford, Conn.

[21] Appl. No.: 394,711

[22] Filed: Jul. 2, 1982

[51] Int. Cl.³ .............................................. G06C 15/42
[52] U.S. Cl. ......................... 235/144 D; 235/144 PN; 235/144 SM; 235/131 FD; 192/71
[58] Field of Search ................. 235/1 C, 61 M, 94 A, 235/94 R, 131 R, 131 FD, 131 M, 139 A, 144 PN, 144 R, 144 SM, 144 D, 144 TP, 144 SP, 142, 143; 192/71, 76

[56] References Cited

U.S. PATENT DOCUMENTS

| | | | |
|---|---|---|---|
| 2,035,891 | 3/1936 | Jeffrey | 235/144 PN |
| 2,735,526 | 2/1956 | Gemmel | 192/71 |
| 2,905,294 | 9/1959 | Kellogg | 192/71 |
| 2,996,241 | 8/1961 | Hoffmann | 235/1 C |
| 3,223,316 | 12/1965 | Coulter et al. | 235/1 R |
| 4,142,672 | 3/1979 | Smilgys | 235/131 FD X |

FOREIGN PATENT DOCUMENTS 735443  8/1955  United Kingdom ............... 235/1 R

*Primary Examiner*—Benjamin R. Fuller
*Attorney, Agent, or Firm*—Prutzman, Kalb, Chilton & Alix

[57] ABSTRACT

An improved counter wheel assembly comprising an indicia wheel, a reset gear, a reset control mechanism for resetting the indicia wheel to a zero position, a drive gear, and a drive clutch for selectively engaging the indicia wheel to the drive gear. In one form, the drive clutch comprises an elongated pawl engageable with a frusto-conical surface integral with the drive gear and adjacent to and immediately inwardly of the rim of the indicia wheel. In a second embodiment, the drive clutch means comprises a pair of substantially identical V-shaped pawls that pivot in tandem to selectively engage serrations of a substantially cylindrical engagement surface.

20 Claims, 4 Drawing Figures

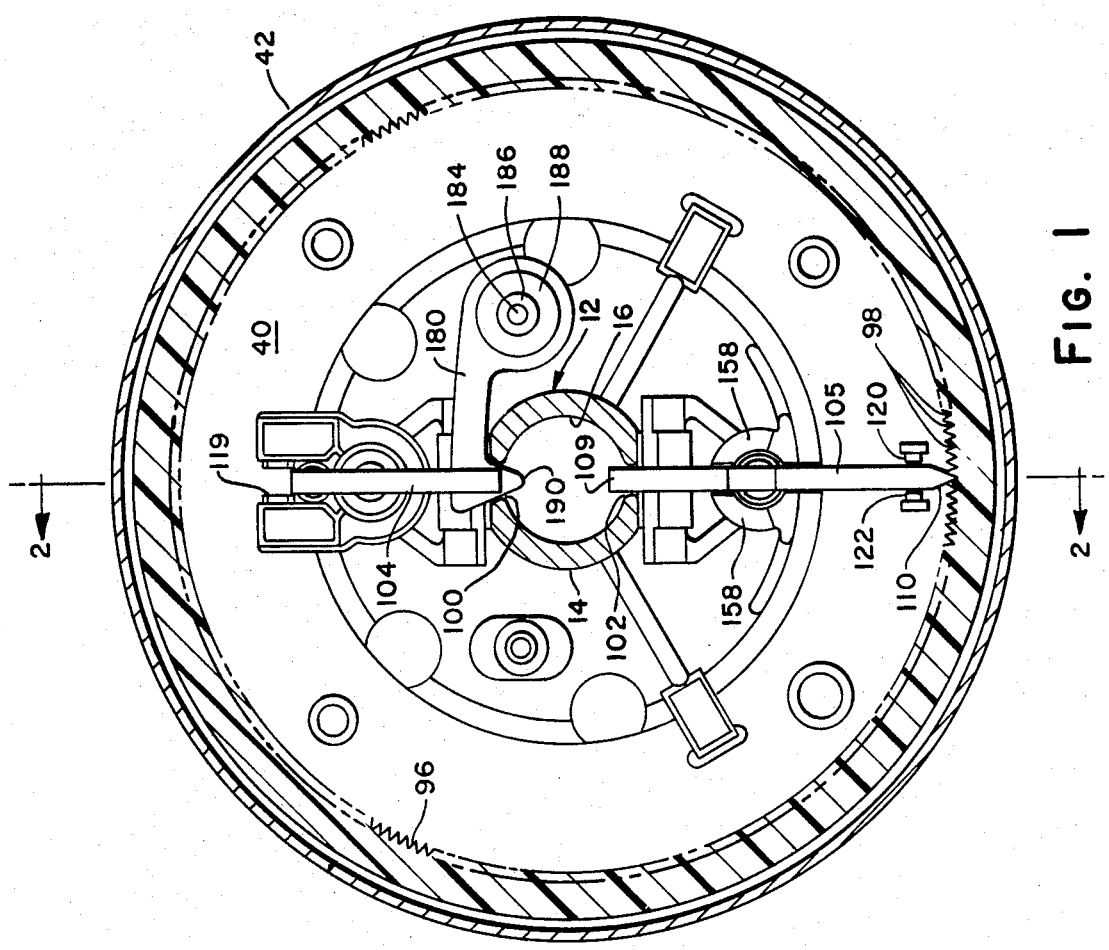
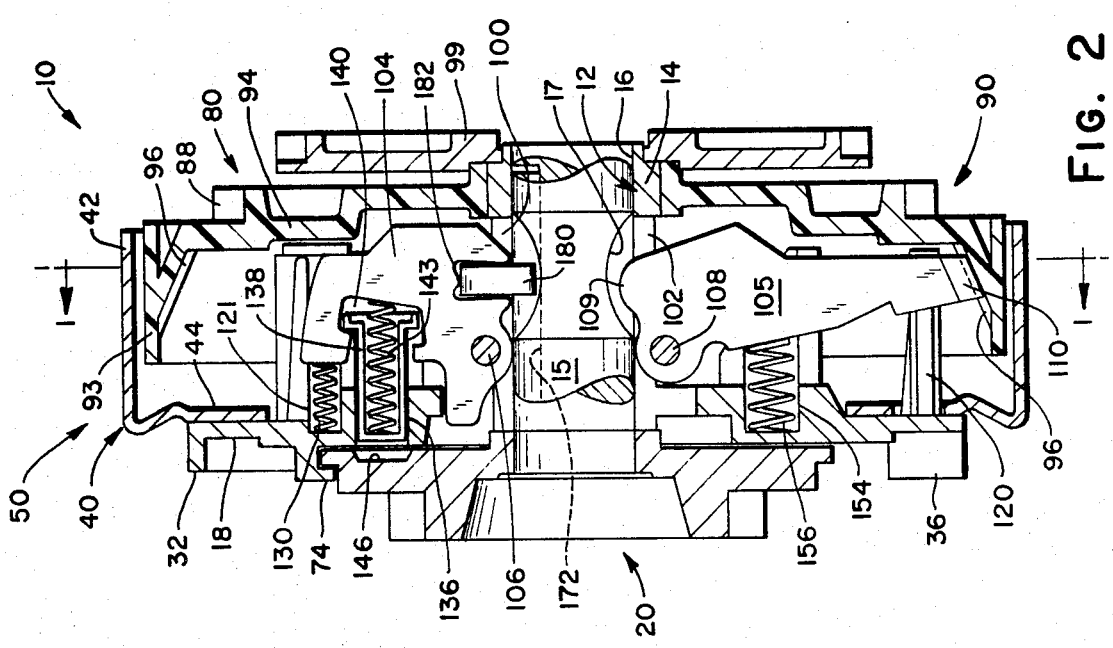

COUNTER WHEEL ASSEMBLY WITH IMPROVED DRIVE CLUTCH MECHANISM

The present invention relates generally to resettable registers of the type employed in fuel dispensing apparatus for registering the volume and/or cost amount of fuel dispensed, as for example, of the type shown and described in U.S. Pat. No. 2,932,448 of H. N. Bliss dated Apr. 12, 1960 and entitled "Resetting Mechanism For Counters", and relates more particularly to a resettable counter wheel assembly of the type disclosed in U.S. Pat. No. 2,932,448, U.S. Pat. No. 3,223,316 of L. E. Colter et al dated Dec. 14, 1965 and entitled "Counter Wheel Assembly" and in U.S. Pat. No. 4,142,672 of Bruno S. Smilgys dated Mar. 6, 1979 and entitled "Counter Wheel Assembly With Improved Reset Control Mechanism".

The foregoing patents disclose counter wheel assemblies of a type comprising an indicia wheel, an independently rotatable reset gear, a reset control mechanism for selectively engaging the reset gear to the indicia wheel (by axially shifting its support shaft) to reset the indicia wheel to a predetermined reset or zero position and to disengage the reset gear and to lock the indicia wheel to its support shaft when in the reset position and clutch means for engaging the indicia wheel with a drive gear to provide counting by rotation of the indicia wheel.

The present invention is directed to an improved clutch means for engaging the indicia wheel with the drive gear to provide counting in a counter wheel assembly by rotation of the indicia wheel. The invention is primarily employed in conjunction with the lower order indicia wheel. The present invention is particularly advantageous when used in conjunction with an indicia wheel having the numerals 0-99, rather than the more conventional 0-9 numeric sequence because of the provision of increased precision of drive engagement and disengagement between the drive gear and the indicia wheel.

BRIEF SUMMARY OF THE INVENTION

Briefly stated, in one form the present invention is an improved drive clutch mechanism for a counter wheel assembly of a type having an indicia wheel rotatably mounted on a shaft, an independently rotatable reset gear, reset means for selectively engaging the reset gear to the indicia wheel to reset the indicia wheel to a reset position, a drive gear, and drive clutch means to selectively engage the indicia wheel to the drive gear. The improved drive clutch means comprises an engagement surface which is integrated with the drive gear structure. The engagement surface is positioned interiorly adjacent the rim of the indicia wheel so as to be substantially concentric with the indicia wheel. Selective engagement is provided by an elongated pawl pivoted on the indicia wheel and adapted to selectively engage the engagement surface.

The engagement surface is of substantially frusto-conical shape having an axial component greater than the radial component and, in a preferred form, comprises a plurality of serrations extending at an angle oblique to the axis of rotation of the indicia wheel.

The elongated pawl is further adapted to interact with a recess on the shaft so as to provide selective engagement and disengagement of the pawl with the engagement surface.

A second embodiment of the improved drive clutch mechanism comprises a substantially cylindrical engagement surface extending from proximate the periphery of the drive gear which surface comprises a plurality of serrations oriented substantially parallel to the shaft. A pair of pawls each pivotally mounted to the indicia wheel are adapted to selectively engage the serrations. The pawls operate in tandem by means of a spring and selective interaction of the pawls with a recess on the shaft to provide selective engagement and disengagement of the pawls with the engagement surface.

Each of the pawls has an engagement arm and an operator arm which extend obliquely from a central pivot point. The pivot points are equidistant from the axis of rotation of the indicia wheel. In a preferred form the engagement arms have a notch at a corner of each arm adapted to engage the serrations of the engagement surface.

An object of the invention is to provide a counter wheel assembly having a new and improved drive clutch which is less sensitive to gear wobble and manufacturing variations.

An object of the invention is to provide a counter wheel assembly having a new and improved drive clutch which provides for increased counter accuracy.

Another object of the invention is to provide a counter wheel assembly having a new and improved drive clutch which provides for improved response in the transfer of drive torque to the indicia wheel of a counter wheel assembly.

A further object of the invention is to provide a counter wheel assembly having a new and improved drive clutch adaptable for use with counter wheels employing one hundred count increments.

A further object of the invention is to provide a counter wheel assembly having a new and improved drive clutch which drive clutch may be incorporated into existing counter wheel assemblies without extensive modification of the existing counter wheel assembly.

Other objects and advantages of the invention will become apparent from the accompanying drawings and specification.

BRIEF DESCRIPTION OF THE DRAWINGS

FIG. 1 a transverse section view, partly broken away and partly in section, taken substantially along line 1—1 of FIG. 2, and showing a counter wheel assembly incorporating an embodiment of the present invention.

FIG. 2 is an axial section view, partly broken away and partly in section, showing the counter wheel assembly and its supporting shaft in a normal counting condition or drive mode;

DETAILED DESCRIPTION

With reference to the drawings, a counter wheel assembly incorporating the present invention identified by the numeral 10 may be constructed generally similar to the counter wheel assembly disclosed in the aforementioned U.S. Pat. Nos. 2,932,448, 3,223,316 and 4,142,672, excepting for the modifications provided by the present invention.

Figure 4:
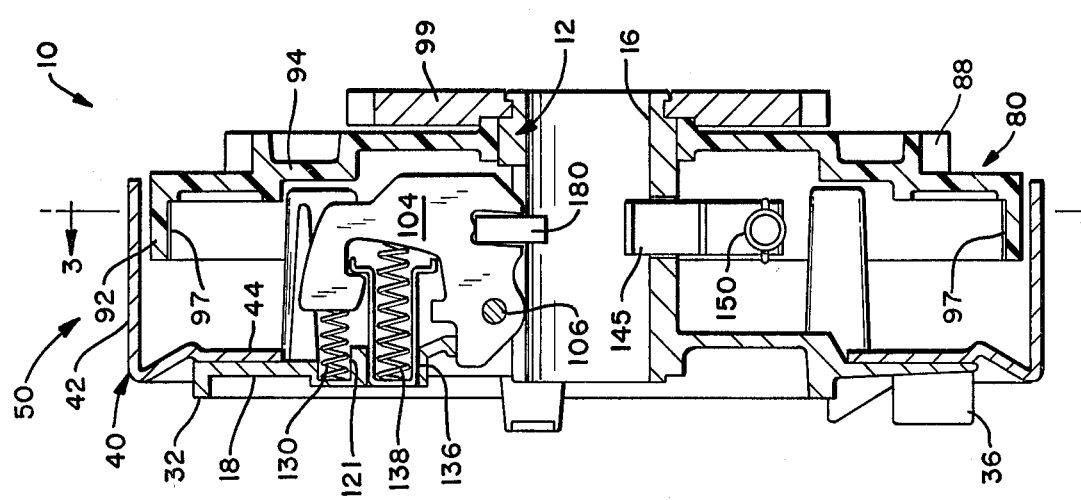
FIG. 4 is an axial section view, partly broken away and partly in section, of the embodiment shown in FIG. 3 illustrating the counter wheel assembly and drive gear in a normal counting condition or drive mode.

With reference to FIGS. 2 and 4, the counter wheel assembly 10 comprises from left to right or from the higher order end to the lower order end, a reset gear 20, an indicia wheel shown generally as 50, and drive gear 80 all of which are rotatable about counter wheel reset shaft 15. Counting is provided by the rotation of indicia wheel 50. The rotation is imparted by drive engagement of the indicia wheel 50 with drive gear 80. A drive clutch mechanism for selectively engaging the indicia wheel 50 with the drive gear 80 is shown generally as 90.

Interaction of reset gear 20 with indicia wheel 50 functions to provide a means to reset the indicia wheel to a reset or zero position such as described in U.S. Pat. No. 4,142,672. Although the present invention may be used in combination with a number of reset control mechanisms, for purposes of illustration the invention will be described in relation with reset mechanisms described in the aforementioned patents.

With further reference to FIGS. 1 and 2, the counter wheel assembly comprises a cast hub 12 having a central tubular portion 14 with a bore 16 for receiving a counter wheel reset shaft 15. An integral radial flange 18 is adjacent the previously designated higher order axial end of wheel assembly 10. The flange 18 has a peripheral partially cylindrical shoulder 32 for engagement by a mutilated transfer pinion (not shown) for holding the transfer pinion against rotation and a double tooth transfer segment 36 adapted to engage the mutilated transfer pinion to transfer a count to the next higher order wheel (not shown). The counter wheel assembly 10 of the present invention has particular utility as the right hand or lowest order wheel in a fuel pump cost and volume counter system of the type shown and described in U.S. Pat. No. 2,932,448.

Indicia wheel 50 comprises an indicia bearing rim 40 which is preferably constructed of sheet metal aluminum and includes a generally cylindrical portion 42 that is suitably embellished with appropriate indicia. Conventional wheels employ the numerals 0-9. However, the present invention is particularly advantageous for use with indicia wheels employing the numerals 0-99. Indicia bearing rim 40 further includes an inwardly extending radial flange portion 44 which is riveted to the hub flange 18.

A reset gear 20 of the type disclosed in U.S. Pat. Nos. 2,932,448 and 4,142,672 is rotatably mounted on the wheel support shaft 15 at the higher order end of the counter wheel assembly. The reset gear 20 is retained against axial outward movement by an adjacent higher order wheel (not shown) or end washer (not shown) and is retained for assembly purposes by a plurality of integral angularly spaced retaining lugs 74 of hub flange 18. The reset gear 20 engages the end of the central tubular portion 14 of hub 12 for retaining the reset gear 20 against inward axial movement toward the lower end of the shaft.

A drive gear 80 which is preferably be constructed of a rugged plastic material is rotatably mounted on the tubular portion 14 at the lower order end of the indicia wheel 50 opposite reset gear 20. Drive gear 80 is retained against outward axial movement by a radial annular shoulder or flange 99 of a retaining collar secured to the end of central tubular portion 14 of hub 12.

Drive gear 80 comprises a substantially disc like portion 94 extending radially from portion 14. A cylindrical rim 92 at the periphery of portion 94 and substantially orthogonal thereto extends interiorly relative to rim 40 toward the higher order end of the shaft. The diameter of rim 92 is slightly less than the corresponding diameter of rim 40 so that rim 92 and cylindrical portion 42 are in an adjacent concentric relationship as illustrated in FIG. 2.

An engagement surface 96 of a substantially frustoconical shape on the interior of rim 92 slants from the higher order end of rim 92 to portion 94. A plurality of equally spaced serrations 98 extend inwardly from engagement surface 96. In preferred form, the angle of the engagement surface 96 with the axis of rotation of the indicia wheel is on the order of 30 to 40 degrees, the axial component of surface 96 being greater than the radial component. The relatively large number of serrations (300 serrations is a preferred embodiment) provides for increased precision in the engagement of the indicia wheel with the drive gear as will be more fully described below. The increased number of serrations are provided by maximizing the circumference of the engagement surface by positioning same adjacent the rim of the indicia wheel. The degree of closeness is limited by the requirement that the indicia wheel 50 and the cylindrical rim 92 move freely relative to each other in certain operation modes. In addition, the provision whereby the axial component of the engagement surface is greater than the radial component minimizes inaccuracies and inefficient operation due to gear wobble.

It should be understood that the lower order end face of portion 94 further comprises a rim having a plurality of gear teeth 88 projecting radially away from the axis of rotation of drive gear 80. Teeth 88 engage with the drive mechanism (not shown) of the wheel assembly to transfer the drive force to the drive gear and ultimately by way of drive clutch mechanism 90 to the indicia wheel. The drive mechanism is not the subject of this invention.

With further reference to FIG. 2, the central tubular portion 14 of the hub 12 is provided with a pair of diametrically opposed slots 100 and 102 extending from the higher order end of the tubular portion to adjacent drive gear 80. A pair of diametrically opposed radially extending reset and drive gear pawls 104 and 105, preferably of sintered metal construction are mounted in the opposed slots 100 and 102, respectively. Pawls 104 and 105 are pivotally mounted on wheel hub 12 about parallel transversely extending axes by pivot pins 106 and 108, respectively, for which purpose the hub is cast to provide a pair of transversely spaced pockets for each of the pivot pins 106 and 108.

Reset gear pawl 104 is described in U.S. Pat. No. 4,142,672 and functions substantially as the reset gear pawl in that patent. The hub flange 18 is formed to provide a radial slot 119 for receiving the reset gear pawl 104 and a generally cylindrical recess 121 for a compression spring 130 which is operative to engage the reset gear pawl 104 to pivotally urge the pawl in the clockwise direction, as shown in FIG. 2. An axially extending opening 136 in the flange 18 forms a generally cylindrical recess for sheet metal locking plunger 138. The plunger 138 is provided with a radial flange at its inner end which is received within a slot 140 in the reset gear pawl 104. Accordingly, with the reset gear pawl 104 in its normal position, illustrated in FIG. 2, maintained by the compression spring 130, the plunger 138 is in its retracted position clear of reset gear 20. Upon pivotal actuation of the reset gear pawl 104 in the counter-clockwise direction as shown in FIG. 2, the plunger 138 is urged axially under the force of compression spring 143 into engagement with reset gear 20. Reset gear 20 is provided with a plurality of angularly spaced cylindrical recesses 146 which receive plunger 138. Recesses 146 are further adapted to receive the tapered end of the plunger 138 for securely connecting the reset gear to the indicia wheel to reset the indicia wheel to zero as described in U.S. Pat. No. 2,932,448.

An axially extending generally cylindrical recess 154 is provided in flange 18 for receiving a compression coil spring 156 adapted to urge the elongated drive gear pawl 105, in the counter-clockwise direction as viewed in FIG. 2, into engagement with the serrated surface 96 of drive gear 80. The latter engagement provides a drive engagement between the indicia wheel 50 and the drive gear 80 for accomplishing the counting function of the counter wheel assembly by rotation of the indicia wheel 50. Cylindrical recess 154 is defined by a pair of opposing semi-cylindrical web structures 158 which form a radial slot which guides the drive gear pawl 105 as it pivots.

Pawl 105 is provided at its terminus with a tapered tip 110 adapted to be received within an intermediate notch between the teeth or serrations 98 to securely engage the drive gear 80. As shown in FIG. 2, in the counting condition or drive mode wherein pawl 105 engages the serrated engagement surface, the pawl 105 extends substantially perpendicular to the reset shaft 15 in the plane of the reset shaft axis. The engagement edge of the tapered tip 110 is slanted at substantially the same angle as the engagement surface 96 relative to the axis of rotation of the counter wheel assembly. The contact surface between tip 110 and serration 98 has an axial component greater than the radial component relative to the axis of rotation of the counter wheel assembly. A pair of guides 120 and 122 extend from flange 18 near tip 110 to form an outer guide slot for the pawl 105 to hold its outer tip 110 in its desired plane of pivotal movement about pin 108.

In a well known manner, the wheel support shaft 15 for the counter wheel assembly functions as a reset control shaft for both disengaging drive gear 80 and for engaging the reset gear 20 to reset the indicia wheel 50 to the zero or reset position. The latter is accomplished by axially shifting reset shaft 15 to pivotally displace reset pawl 104 and drive gear pawl 105 outwardly from the reset shaft. With reference to FIG. 2, reset shaft 15 has an annular recess 17 which in a normal counting position or drive mode receives projection 109 of drive gear pawl 105. In this latter condition, elongated pawl 105 is pivoted under the force of spring 156, in the counter-clockwise direction as viewed in FIG. 2, until the drive gear pawl 105 engages the serrated clutch rim to provide the drive engagement between indicia wheel 50 and drive gear 80. When the reset shaft 15 is axially shifted (to the right in FIG. 2) projection 109 is displaced from recess 17 and bears against shaft 15 whereby pawl 105 is pivoted out of engagement with the serrated surface 96 until the pawl projection 109 is again received in recess 17. Naturally, disengagement of pawl 105 is required while the indicia wheel is reset.

As further illustrated in FIG. 2, the shaft 15 has an axially extending slot 172 as disclosed in U.S. Pat. No. 3,223,316 which receives the reset gear pawl 104 (or an intermediate pawl 180 which interacts with reset gear pawl 104) when the indicia wheel is located in a fully reset or zero position, whereupon the reset gear 20 is disengaged and the indicia wheel 50 is locked to the reset shaft 15. If the indicia wheel 50 is located in a zero position when the reset shaft 15 is axially shifted, slot 172 receives the reset gear pawl 104 or intermediate pawl 180 and the reset gear is not engaged.

As illustrated in the drawing and further described in U.S. Pat. No. 4,142,672, a second reset control pawl or intermediate pawl 180 may be provided intermediate gear pawl 104 and wheel support shaft 15. The intermediate pawl 180 is pivotally mounted on the integral flange 18 of the hub 12 by means of an integral axially extending boss 184 of the hub 12 and whereby the intermediate pawl 180 is pivotal about an axis parallel but spaced substantially from the axis of the wheel support shaft 15. A reduced outer end 186 of boss 184 is upset against a retaining washer 188 for retaining the intermediate pawl on the boss 184. In the preferred form, the diameter of boss 184 is relatively large and the bearing gap relatively low so that the pawl is mounted to have negligible radial movement. Pawl 180 has an outer inwardly projecting nose 190 received within the slot 100 of wheel hub 12 and is adapted t be received within the axially extending radial slot 172 of wheel support shaft 15.

The reset gear pawl 104 has a slot 182 for receiving the intermediate pawl 180. When the shaft 15 is shifted, the intermediate pawl 180 is pivoted out of recess 17 (upwardly as shown in FIGS. 1 and 2) and the reset gear pawl 104 is pivoted in the counter-clockwise direction as viewed in FIG. 2 to lock the reset gear 20 to the indicia wheel 50. Accordingly, the actuating intermediate pawl 180 provides for locking the wheel assembly to the support shaft, when the nose 190 falls into the slot 172, to accurately hold the zero position. Thus, upon re-engagement of the of the drive wheel gear 80 by pawl 105 and subsequent disengagement of pawl 180 from the wheel support shaft 15 when the shaft is axially shifting to recondition the indicia wheel 50 for counting, the wheel is accurately angularly positioned at its zero readout at the start of a succeeding fuel delivery to insure a continuing accurate gasoline delivery readout. Moreover, the improved drive clutch mechanism comprising in part the interaction between the drive gear pawl 105 and the engagement surface 96 of the drive gear 80 provides a precise transfer of torque from the drive gear to the indicia wheel and thereby ensures accurate counting by the rotation of the indicia wheel.

Figure 3:
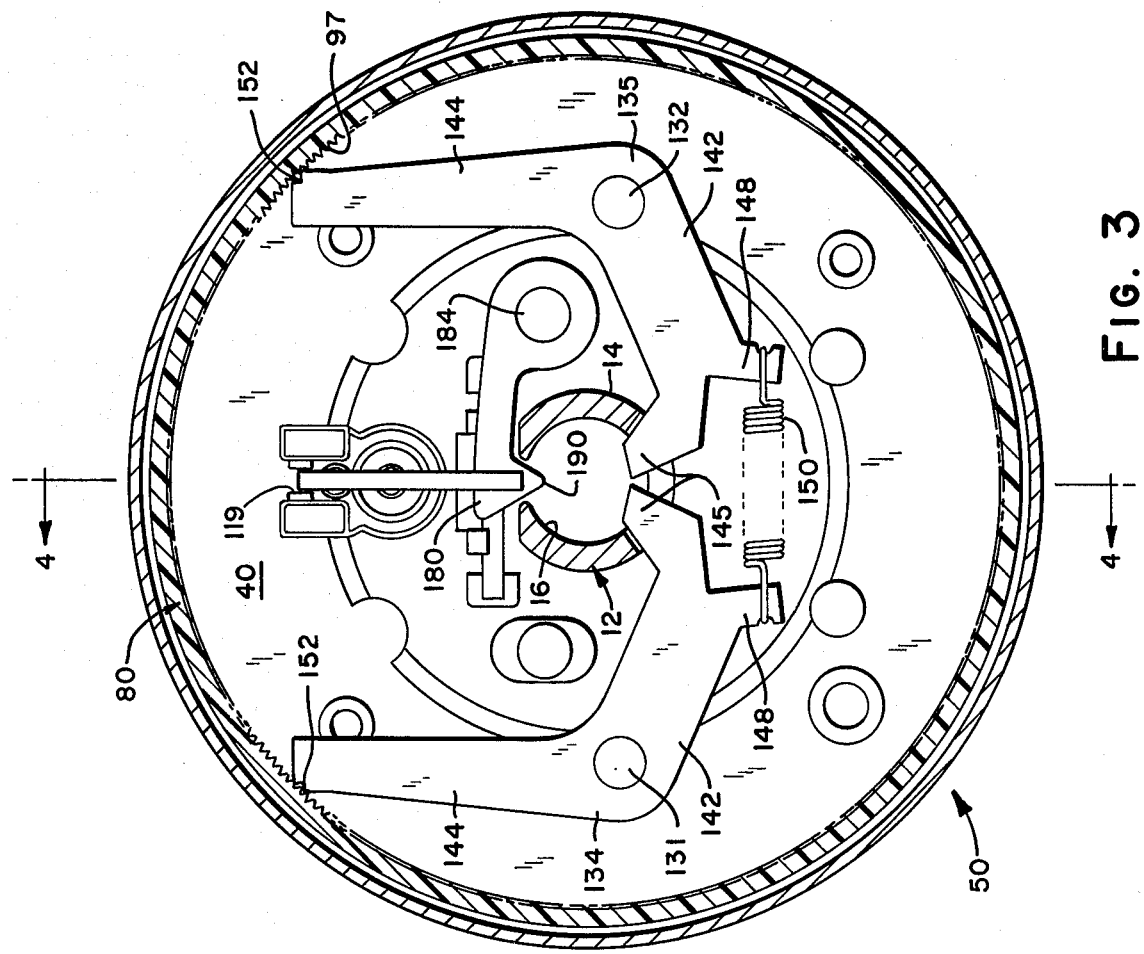
FIG. 3 is a transverse section view, partly broken away and partly in section, taken along line 3—3 of FIG. 4 and showing a counter wheel assembly incorporating a second embodiment of the present invention.

In a second embodiment of the invention illustrated in FIGS. 3 and 4, the drive gear 80 has a generally cylindrical, serrated engagement surface 97 which is provided by a generally cylindrical flange or lip 93. As further illustrated in FIG. 3, a plurality of equally spaced axially extending and radially inwardly pointing teeth or serrations are provided on the engagement surface 97. In a preferred form, the engagement surface 97 is provided with 400 teeth or serrations. In a manner analogous to the first described embodiment, the engagement surface 97 is adjacent to and in concentric relation with the cylindrical portion 42 of the indicia wheel 50.

A pair of axially extending pivot pins 131 and 132 are mounted on the wheel flange 18. The pins 131 and 132 are offset equidistantly from the central tubular portion 14 and are parallel to the shaft 15 (shaft not shown in FIGS. 3 and 4). Each of a pair of substantially V-shaped drive gear pawls 134 and 135 are pivotally mounted to pins 131 and 132 proximate the centers of the pawls. Pawls 134 and 135 pivot in tandem in a plane substantially normal to the axis of rotation of the indicia wheel. By contrast the single elongated drive gear pawl of the first embodiment essentially pivots in a plane which includes the axis of rotation of the indicia wheel.

Drive gear pawls 134 and 135 are substantially identical structures, each comprising an engagement arm 144 and an operator arm 142 obliquely extending from proximate the pivot axis of the pawl.

The operator arms 142 terminate with knobs or radial projections 145 dimensioned to be received in recess 17 of reset shaft 15 (as shown in FIG. 3) to interact with recess 17 in a manner analogous to that previously described relative to projection 109 of pawl 105 of the first embodiment (shaft 15 and recess 17 not shown in FIG. 3).

A spring 150 connects between spring supports 148 which extend in a direction generally opposite to that of the engagement arms 144. Spring 150 is tensioned to bias the engagement arms 144 outwardly in opposite pivotal directions into engagement with the clutch surface 97 as illustrated in FIG. 3.

The ends of the engagement arms 144 are provided at their outside corners with a notch 152 which is adapted to engage the serrations or teeth of the engagement surface 97. In the drive mode shown in FIG. 3, the knobs 145 are received in recess 17 so that the pawls 134 and 135 are pivoted by the force of spring 150 to engage the arms 144 with opposite sides of the engagement surface 97.

When the reset shaft 15 is axially shifted, the knobs 145 are displaced radially outwardly from the recess 17 to pivot the drive gear pawls 134 and 136 pivoting in opposition to the force of spring 150. The engagement arms likewise pivot inwardly to disengage the engagement surface 97.

The description and function of the reset gear and the drive gear and their interaction with the shaft 15 is analogous to that previously described relative to the first elongated pawl embodiment. The employment of the tandem engagement mechanism provides for a secure engagement of the drive gear with the indicia wheel and a precise and efficient transfer of torque from the drive gear to the indicia wheel. The circumference of the engagement surface is essentially maximized by positioning the engagement surface close to the indicia rim to provide for more serrations and consequently increased accuracy in the drive engagement. Also, the points of engagement of the two clutch pawls 134, 135 are related to their pivot pins 131, 132 so that the pawls provide a wedging action to lock the indicia wheel against rotation.

The present invention is primarily applicable to the right hand or lowest order wheel of the cost and volume counters of a fuel pump register of the type described in U.S. Pat. No. 2,932,448. The present invention can be readily incorporated not only in the production of new indicia wheel assemblies but also through the conversion of existing wheel assemblies, for example, during periodic overhaul of the fuel pump register.

As will apparent to persons skilled in the art, various modifications and adaptions and variations of the foregoing specific disclosure can be made without departing from the teachings and scope of the present invention.

I claim:

1. In a counter wheel assembly having an indicia wheel with an indicia rim rotatably mounted on a shaft, an independently rotatable reset gear coaxial with the indicia wheel, reset means for selectively engaging a reset gear to the indicia wheel to a reset position and lock the indicia wheel in the reset position to the shaft, a drive gear coaxial with the indicia wheel and drive clutch means to selectively engage the indicia wheel with the drive gear, the improvement wherein the drive clutch means comprises an engagement surface integral with the drive gear, said surface comprising a plurality of serrations extending at an angle oblique to the axis of rotation of the indicia wheel, said surface being adjacent to the rim of the indicia wheel and substantially concentric therewith, and an elongated pawl pivoted on said indicia wheel and adapted to selectively engage said engagement surface.

2. The counter assembly of claim 1 wherein said engagement surface is substantially frustoconical having an axial component greater than the radial component.

3. The counter wheel assembly of claim 2 wherein the oblique angle is on the order of 40 degrees and the number of serrations is 300.

4. The counter wheel assembly of claim 1 wherein said elongated pawl further comprises a projection adapted to be received in a recess on said shaft, said pawl being urged by a spring so that when said assembly is in a drive mode, said projections is received in said recess and said pawl engages the engagement surface and when the assembly is in a reset mode, said projection is displaced from said recess and the pawl disengages the engagement surface.

5. The counter wheel assembly of claim 1 further comprising a pair of guides projecting from the indicia wheel, said guides being positioned proximate the distal end of said elongated pawl.

6. In a counter wheel assembly having a shaft, an indicia wheel rotatably mounted on the shaft, an independently rotatable reset gear coaxial with the indicia wheel, reset means for selectively engaging the reset gear to the indicia wheel to reset the indicia wheel to a reset position and to lock the indicia wheel to the shaft in the reset position, a drive gear coaxial with the indicia wheel, and drive clutch means to selectively engage the indicia wheel with the drive gear, the improvement wherein the drive clutch means comprises a substantially cylindrical engagement surface extending from said drive gear, said surface comprising a plurality of serrations substantially parallel to the shaft and a pair of pawls each pivotally mounted on the indicia wheel to selectively engage the serrations, each said pawl comprising an engagement arm, an end of said arm being adapted to engage the engagement surface, and an operator arm adapted to selectively interact with the shaft.

7. The counter wheel assembly of claim 6 further comprising a spring connected between said pawls and pivotally urging said engagement arms in opposite pivotal directions into engagement with said engagement surface.

8. The counter wheel assembly of claim 7 wherein said operator arms have ends adapted to selectively interact with a recess on said shaft whereby upon reception of the operator arm ends in said recess, the engagement arms engage said engagement surface to provide rotational drive between said indicia wheel and drive gear, and upon displacement of said operator arms from said recess, the engagement arms are disengaged from said engagement surface.

9. The counter wheel assembly of claim 6 wherein an engagement arm end has a notch adapted to engage the serrations.

10. The counter wheel assembly of claim 6 wherein the pawls pivot about axes parallel and equidistant from the axis of rotation of the indicia wheel.

11. The counter wheel assembly of claim 6 said pawls are substantially identical V-shaped structures.

12. In a counter wheel assembly having a reset control shaft, an indicia wheel rotatably mounted on the reset control shaft, a reset gear coaxial with the indicia wheel and independently rotatable therewith, a reset pawl mechanism having a reset gear pawl pivotally mounted on the indicia wheel for pivotal movement about an axis transverse to the axis of rotation of the indicia wheel for selective engagement of the reset gear, said reset pawl mechanism having an inward projection selectively engageable by the reset control shaft for pivoting the reset pawl out of engagement with the reset gear, the inward projection of the reset pawl mechanism being receivable in an axial slot in the reset shaft for locking the indicia wheel to the reset shaft in the reset position of the indicia wheel and with the reset gear disengaged, a drive gear coaxial with the indicia wheel and drive clutch means to selectively engage the indicia wheel with the drive gear, the improvement wherein the drive clutch means comprises a plurality of serrations extending inwardly and substantially parallel to the reset control shaft, and a pair of drive pawls each pivotally mounted on the indicia wheel about axes parallel to and equidistantly from the axis of rotation of the indicia wheel, each of said drive pawls comprising an engagement arm adapted to selectively engage the serrations and an operator arm adapted to interact with the reset control shaft to selectively pivot said drive pawls and thereby provide selective engagement of said engagement arms with said drive gear serrations.

13. The counter wheel assembly of claim 12 further comprising a spring extending between said operator arms to pivotally urge the engagement arms away from each other toward the serrations.

14. The counter wheel assembly of claim 12 wherein the end of each of said engagement arms comprises a notch adapted to engage the serrations of said drive gear.

15. The counter wheel assembly of claim 12 wherein each operator arm further comprises a projection adapted to be received in a recess of the reset support shaft generally opposite said axial slot thereby pivoting the engagement arm into engagement with said drive gear serrations.

16. In a counter wheel assembly having a reset control shaft, an indicia wheel with an indicia rim rotatably mounted on the reset control shaft, a reset gear coaxial with the indicia wheel and independently rotatably therewith, a reset pawl mechanism having a reset gear pawl pivotally mounted on the indicia wheel for pivotal movement about an axis transverse to the axis of rotation of the indicia wheel for selective engagement of the reset gear, said reset pawl mechanism having an inward projection selectively engageable by the reset control shaft for pivoting the reset pawl out of engagement with the reset gear, the inward projection of the reset pawl mechanism being receivable in an axial slot in the reset shaft for locking the indicia to the reset shaft in the reset position of the indicia wheel and with the reset gear disengaged, a drive gear coaxial with the indicia wheel and drive clutch means to selectively engage the indicia wheel with the drive gear, the improvement wherein the drive clutch means comprises a drive gear with an engagement surface adjacent and concentric with the rim of the indicia wheel and said drive clutch means comprises an elongated pawl pivotally connected at one end to the indicia wheel, the distal end of which pawl is adapted to engage said engagement surface.

17. The counter wheel assembly of claim 16 wherein said elongated pawl further comprises a projection adapted to be received in a recess on said reset shaft, said pawl being urged by a spring so that said pawl engages the engagement surface when the assembly is in drive position and said projection is displaced from said recess to force the pawl to disengage the engagement surface when the reset gear engages with the indicia wheel.

18. The counter wheel assembly of claim 17 wherein said engagement surface further comprises a plurality of serrations projecting inwardly at a angle on the order of substantially 40 degrees relative to the rotational axis of the indicia wheel.

19. The counter wheel assembly of claim 18 further comprising a pair of guides projecting from the indicia wheel, said guides cooperating to guide said pawl proximate the pawl distal end.

20. The counter wheel assembly of claim 17 wherein said engagement surface is substantially frusto-conical having an axial component greater than its radial component.

* * * * *